Aug. 21, 1945.        A. G. DEAN        2,383,370
SHEET METAL STRUCTURE AND METHOD OF MAKING THE SAME
Filed Oct. 16, 1943          2 Sheets-Sheet 1

INVENTOR
Albert G. Dean.
BY John P. Tarbox
ATTORNEY

INVENTOR
Albert G. Dean.

John P. Tarbox
ATTORNEY

Patented Aug. 21, 1945

2,383,370

UNITED STATES PATENT OFFICE 2,383,370

SHEET METAL STRUCTURE AND METHOD OF MAKING THE SAME

Albert G. Dean, Narberth, Pa., assignor to Edward G. Budd Manufacturing Company, Philadelphia, Pa., a corporation of Pennsylvania Application October 16, 1943, Serial No. 506,477

9 Claims. (Cl. 189—34)

This invention relates to metal structures, particularly to structures which include sheet metal panels, and has for an object the provision of improvements in this art.

Sheet metal panels, particularly in thin gauges, are subject to buckling or what is often called "dishpanning" or "oil canning." Local shrinkage due to spaced welds in composite structures may cause these effects. The buckles may be more apparent than real, especially in highly polished sheets like cold-rolled stainless steel; but the wrinkled effect is in any case objectionable and preferably should be eliminated. In some cases the wrinkles are sufficiently real to cause trouble, the more so where the surfaces are subject to constant vibration which is sufficient to cause crystallization or finning or in any case objectionable noise.

Where the wrinkles are merely apparent, i. e., optical phenomena, the effect may be relieved or eliminated by coating the surfaces with a non-specular paint. Stretching the sheets provides some relief from both actual and apparent effects. Very small steep-pitched corrugations have also been tried. But none of the known methods is fully effective in all cases.

According to the present invention, the sheet metal panels are pre-formed with relatively very shallow and relatively wide undulations or alternating creases with sides of narrow absolute width which place pre-tension in the metal and break up the surface into inclined side areas which are so small that the sheet does not present a wrinkled appearance. The sheet is assembled in the composite structure in such a disposition that the principal weld lines cross the undulations. The sheet is thus flattened to a greater or less extent during fabrication, the shrinkage due to welding being accommodated by the initial elongation of the sheet in the undulations. The result is that the final panels are relatively flat, having only residual undulations and these are so narrow that no extensive dishpanning effect is apparent. The panels, however, are so nearly flat that all loads are at once taken up with the same result as if the sheets were flat.

It may be preferable to run the undulations or creases diagonally instead of perpendicularly to the principal weld lines and this is particularly desirable when the creases can be oriented with the principal expected tension stresses in the panel.

The above and other objects and advantages of the invention may be most readily explained by a description of a specific embodiment, reference being made to the accompanying drawings thereof, wherein.

Figure 1:
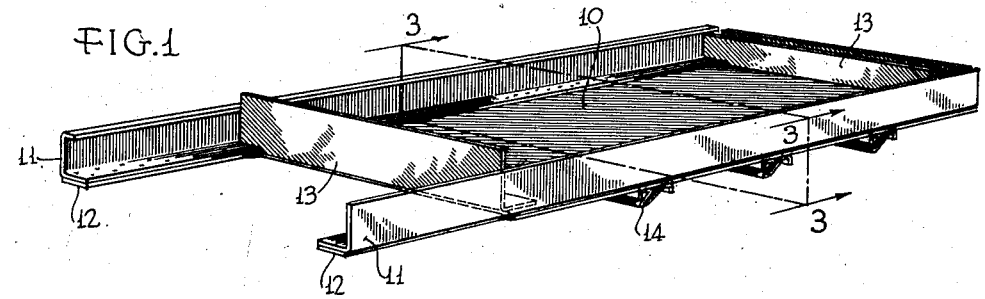
Fig. 1 is a perspective of a composite structure which includes a sheet metal panel embodying the present invention.
Figure 2:
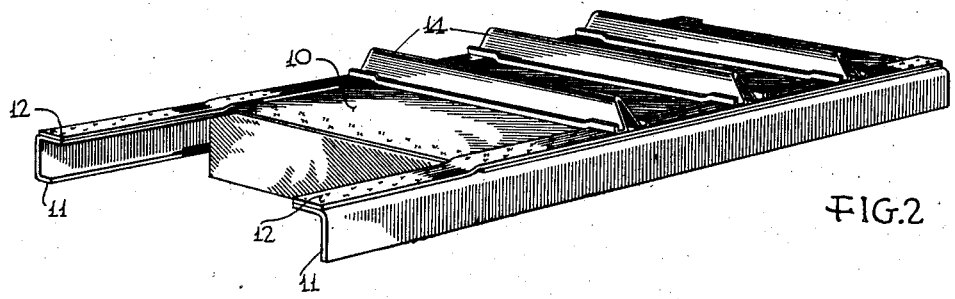
Fig. 2 is a reverse side perspective of the same.
Figure 3:
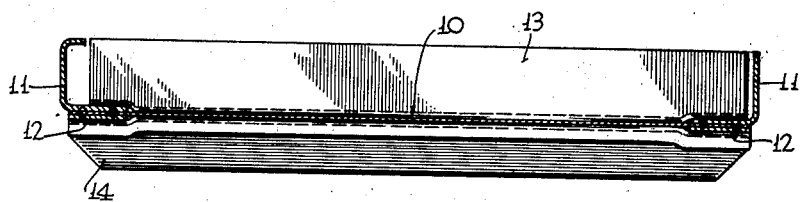
Fig. 3 is a transverse section taken on the line 3—3 of Fig. 1.

Referring to the drawings, Figs. 1, 2 and 3 show an undulated panel 10 secured in a frame comprising longitudinal or chord members 11, doublers 12 secured thereto with the sheet panel between, transverse end struts 13, and intermediate transverse stiffener or struts 14. This structure is merely exemplary and the undulated panels may be used in all kinds of structures. The undulations or creases of the panel run transversely along the principal weld lines along the chords, either perpendicularly or obliquely, and are flattened thereagainst during their securement. While welding principally gives rise to the present construction, it is helpful with riveting or other types of attachment.

Figure 4:
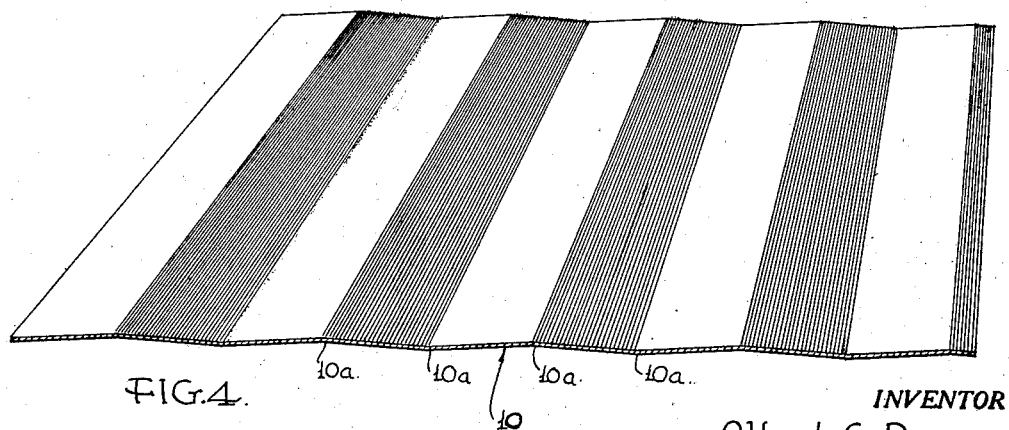
Fig. 4 is a perspective view of an undulated or creased sheet metal panel alone before assembly.

Fig. 4 shows the sheet metal panel 10 alone. It is formed with a plurality of transverse undulations or creases 10a along its length. A convenient method is to form the undulations as the rolls of sheet metal are received and then to treat the sheets generally as flat sheets except to cut and orient the panels so the undulations will be disposed transversely to the principal lines of securement or welds as far as possible. The slopes of the undulations between crease lines or ridges and grooves are shown as plane surfaces but they may be curved. There is nowhere a steep rise or fall in curvature.

The slopes or sides of the undulations are in absolute measurement very narrow, being of much less width than the wrinkles or dishpans which normally form in sheets of the thickness being used; but they are also relatively very wide as compared to their depth. For example, in the construction shown herein the width may be about ¾" and the depth about ⅟₁₆" in a sheet 0.008" thick. The ratio of width to height here is 12 to 1 but may vary considerably for the same gauge stock and more for different gauges. The ratio may run considerably above 12 to 1 but will not go below about 3 to 1 or 4 to 1, because in the lower ratios, particularly with springy metal, the undulations may not flatten sufficiently to give the final panel the strength of a flat sheet. Moreover, if the ratio of width to depth is too small, or if the change in curvature is anywhere abrupt so as to create steep-sided areas, the undulations may be crushed to form sharp bends, fins, or crumpled areas, and this must be avoided.

The method of securing the undulated sheet metal panel to the associated frame elements of a fabricated structure is important. This is preferably done by working progressively from a given point of attachment across undulations toward a free end. Figs. 5 to 9 are included to show this method applied to the structure of Figs. 1 to 3.

Figure 5:
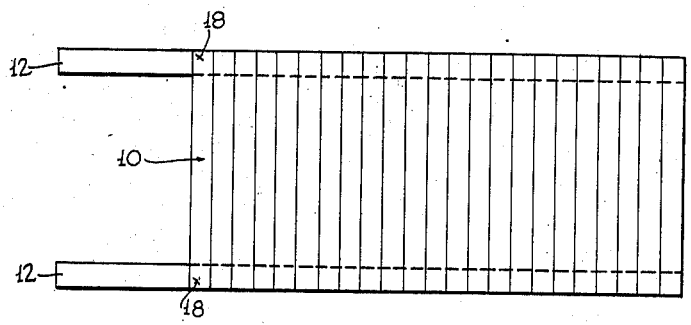
Fig. 5 is a plan view showing the first stage of assembling the panel in the composite structure.

In Fig. 5 the panel 10 is tack welded at one end, as at 18, to the doubler plates 12.

Figure 6:
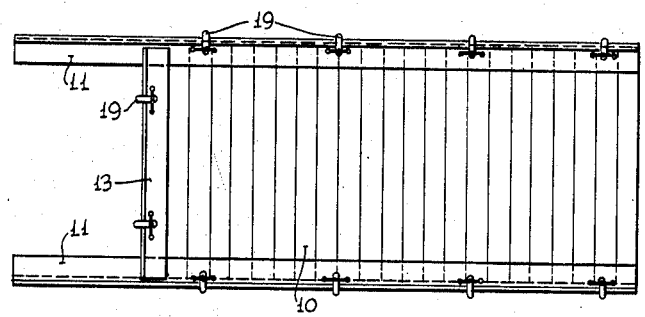
Fig. 6 is a plan view showing a second stage of assembly.

In Fig. 6 the chord members 11 and one end strut 13 are held tightly, as by clamps 19, to the doubler plates with the undulated panel between so there is a tendency to flatten the panel and elongate it toward the free end at the right.

Figure 7:
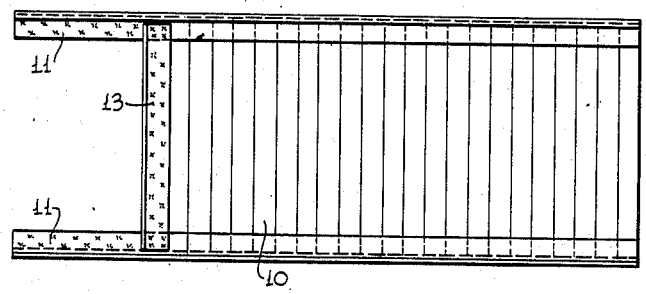
Fig. 7 is a plan view showing a third stage of assembly.

In Fig. 7 the doublers and chords have been welded together at the left beyond the panel and the strut 13 has been welded to the chord members and to the end of the panel 10. The clamps may be retained in whole or in part at this stage but for clarity they are all removed in Fig. 7. In any event, whether by clamps or welding or other attaching tools or both, the panel is initially before attachment substantially flattened and pre-tensioned due to resiliency of the material; and after attachment the panel along the lines of attachment is left in a substantially flat condition.

Figure 8:
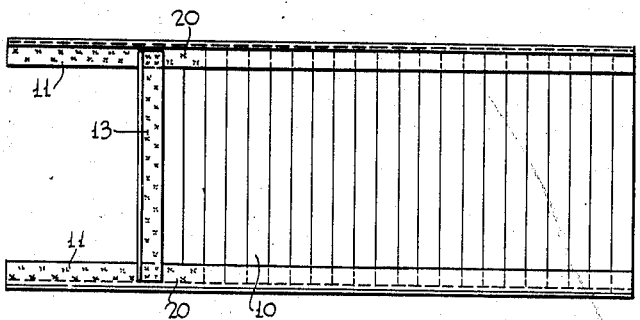
Fig. 8 is a plan view showing a fourth stage of assembly.

In Fig. 8 the welding along the chords has begun as at 20. It is progressive along both chords from the starting end toward the free end, being continuously even along the two chords, as when two roller welders are used, or progressing first with a few welds on one chord and then a few on the other chord if a single welding machine is used. The left crease line shown in Fig. 8 is flattened at the ends where the sheet has been welded. The undulations between the welded ends tend to resume their initial shape and thus obviate the irregular wrinkles which were previously formed and to break up the surface to the vision to give it a smooth appearance.

Figure 9:
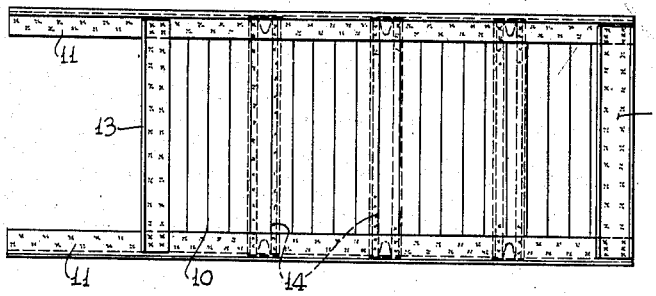
Fig. 9 is a plan view showing the final stage of assembly.

In Fig. 9 the edge welds have been completed to the right end and the other end strut 13 and the intermediate stiffeners 14 have been attached. When the panel is flattened for attachment, either by clamping or otherwise, the undulations are flattened and pre-tensioned due to the inherent resiliency of the material. The attached zones or lines remain in flattened condition after attachment, in case of welding there being a shrinkage of stock in the weld zones and a shortening between welds. In the unattached zones the panel tends to assume its initial undulated condition due to its resiliency and pre-tension. The transverse weld lines across the panel, as along the members 13 and 14, are not as favorable as the longitudinal weld lines along the panel and across the sheet undulations, but they are fully accommodated in the undulations between longitudinal chords; and if they tend to form puckers they will cause no noticeable effect in the surface appearance because the residual undulation effect breaks it up. Diagonal or oblique undulations will help if the structure must have numerous transverse weld lines.

Structures made with panels according to the present invention give test results as satisfactory as those with flat panels and are free from the irregular appearing wrinkles which characterize flat panels. The elongation and resiliency provided appear to compensate fully for the weld shrinkage but without detracting from the flat shear strength of the panel in all directions. Enough residual undulation is left to avoid vibration characteristic of larger dishpans previously formed. If diagonal creases are used and run in the direction of major tension loads the structure may even be stronger than a similar structure using a flat panel.

While one embodiment has been described by way of example, it is to be understood that the invention may have various embodiments within the limits of the prior art and the scope of the subjoined claims.

What is claimed is:

1. A metal structure comprising in combination, a longitudinal member, and a sheet metal panel secured thereto, said panel having transverse non-abrupt undulations which are relatively very shallow and relatively wide but narrow in absolute width, the undulations of the panel being substantially flattened along the frame member transversely of the undulations when secured, the unattached areas of the panel retaining the undulated appearance after attachment but being so nearly flat as to provide the strength of a flat panel, the unattached areas of the panel being placed in a state of pretension due to the flattening of the undulations along said member.

2. A metal structure comprising in combination, a longitudinal member, and a sheet metal panel secured thereto, said panel having transverse non-abrupt undulations which are relatively shallow as compared with their width but in absolute width much narrower than the irregular dishpans which form in sheets of the gauge used, the undulations of the panel being substantially flattened along the line of attachment, the unattached areas of the panel being placed in a state of pre-tension due to the flattening of the undulations along said member.

3. A structure as set forth in claim 2, further characterized by the fact that said undulations have a depth less than one-third their width on one slope or side from crest to valley.

4. A structure as set forth in claim 2, further characterized by the fact that the areas between crests and valleys are approximately plane surfaces.

5. A metal structure comprising in combination, a plurality of spaced longitudinal members, and a sheet metal panel secured thereto, said panel having transverse non-abrupt undulations which are relatively shallow as compared with their width but in absolute width being narrow, the panel after attachment being left substantially flattened along the lines of attachment to said members and the panel elsewhere being still undulated but so nearly flat in final attached conditions as to take loads like a flat panel, the unattached areas of the panel being placed in a state of pre-tension due to the flattening of the undulations along said members.

6. A metal structure as set forth in claim 5, further characterized by the fact that the undulations are oblique to the lines of attachment.

7. The method of fabricating a structure composed of longitudinal members and a sheet metal panel having non-abrupt undulations which are relatively shallow compared to their width, which method comprises flattening the undulations along the length of the members and securing the panel to the members to provide the effect of a flat panel but without the appearance or objectionable effects of dishpanning characteristic of a flat panel, the unattached areas of the panel being placed in a state of pre-tension due to the flattening of the undulations along said members.

8. The method as set forth in claim 7, further characterized by the fact that the panel is welded to said members progressively from a first point of attachment to a free end thereof.

9. The method as set forth in claim 7, further characterized by the fact that the panel is secured to said members progressively and evenly from a first point of attachment to a free end thereof.

ALBERT G. DEAN.